Figure 4:
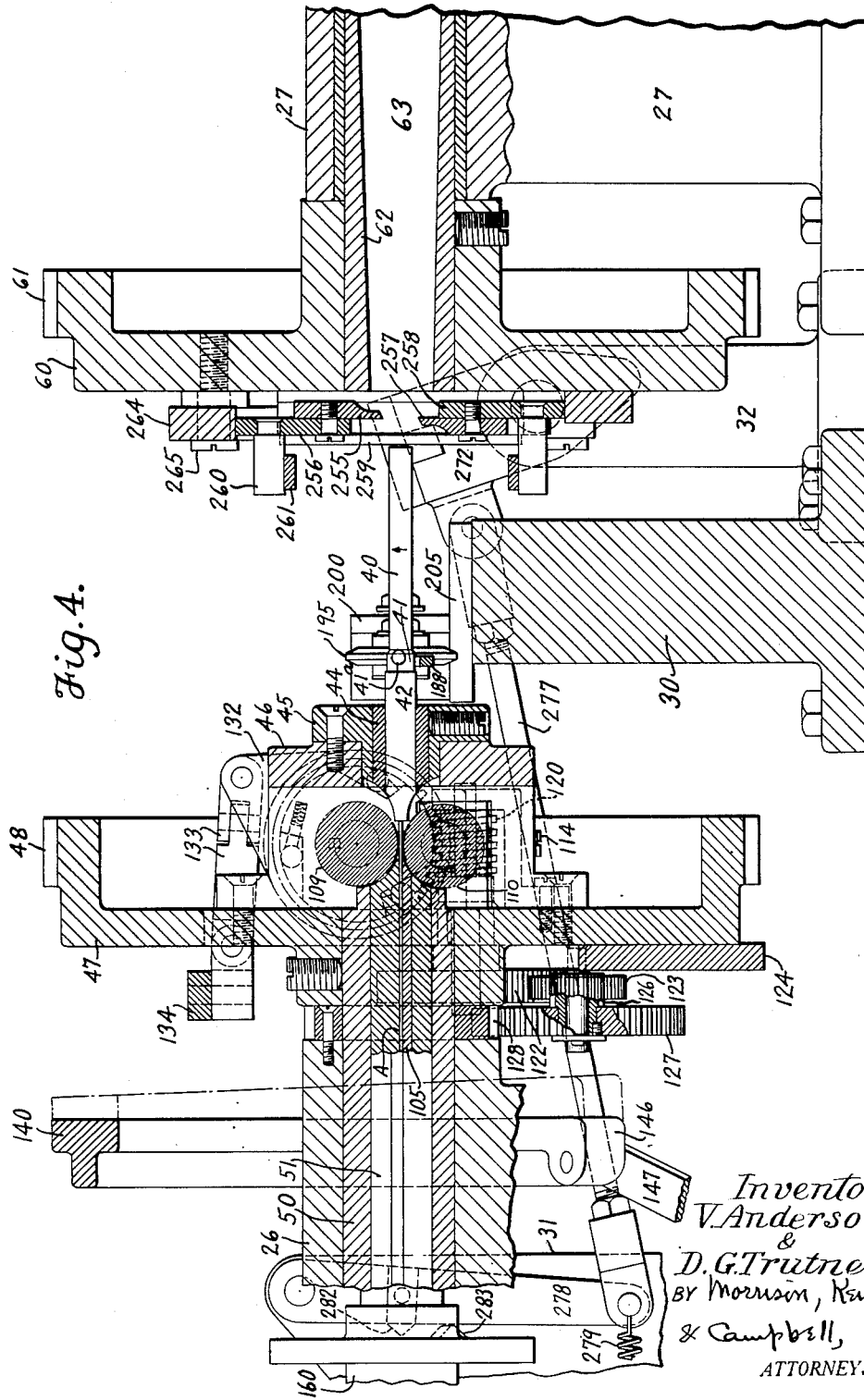

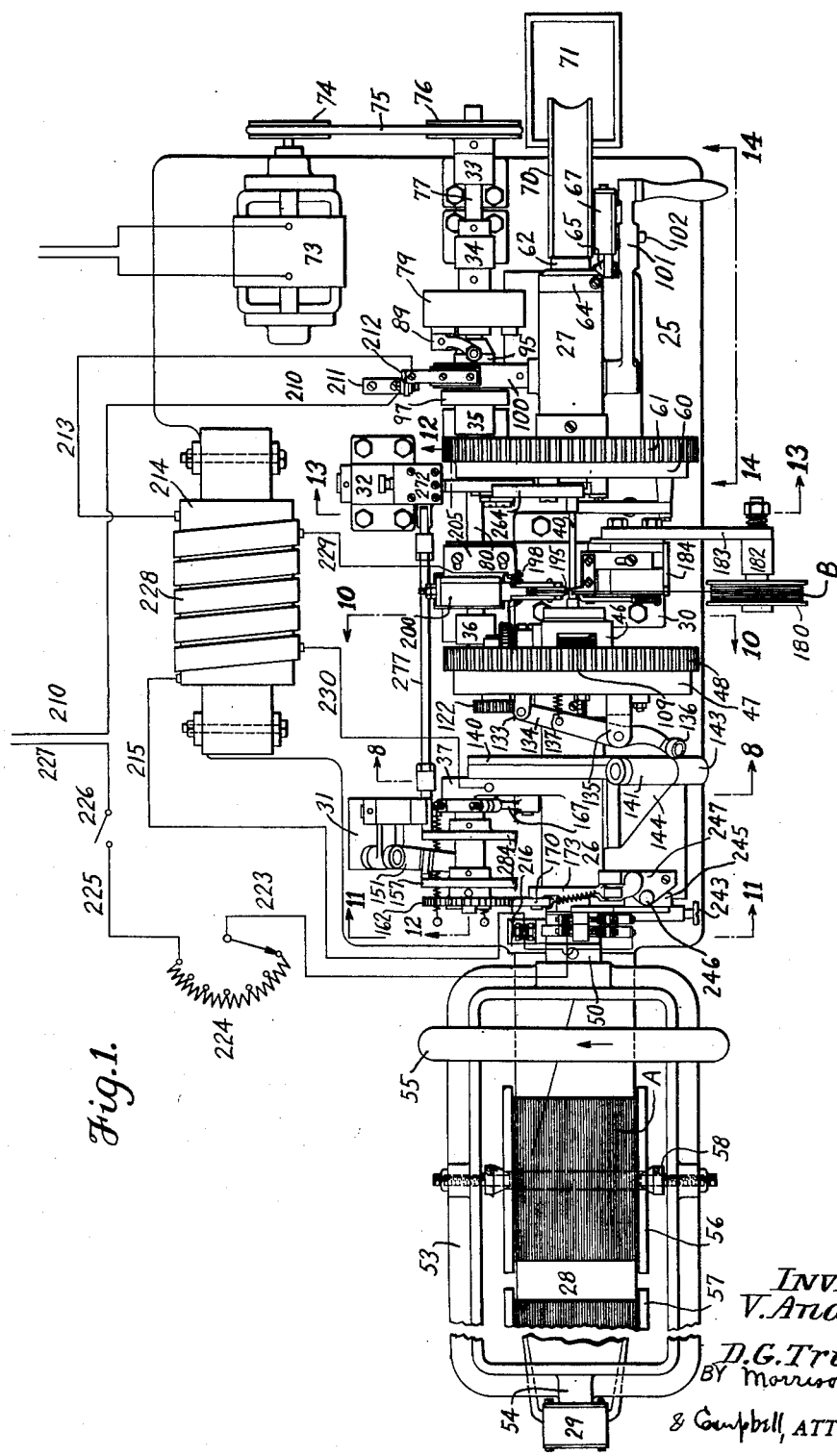

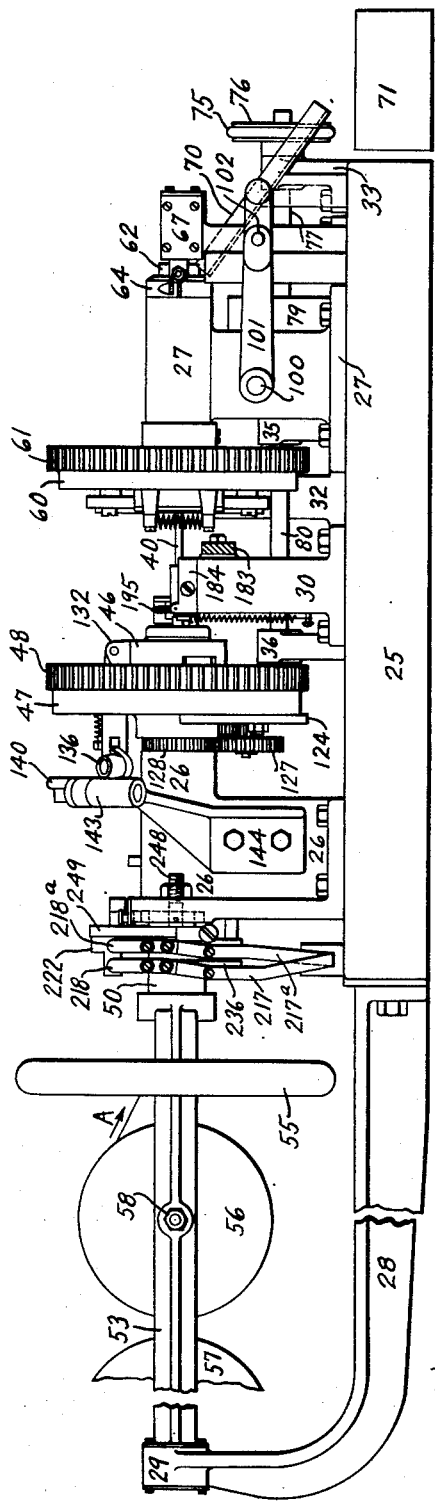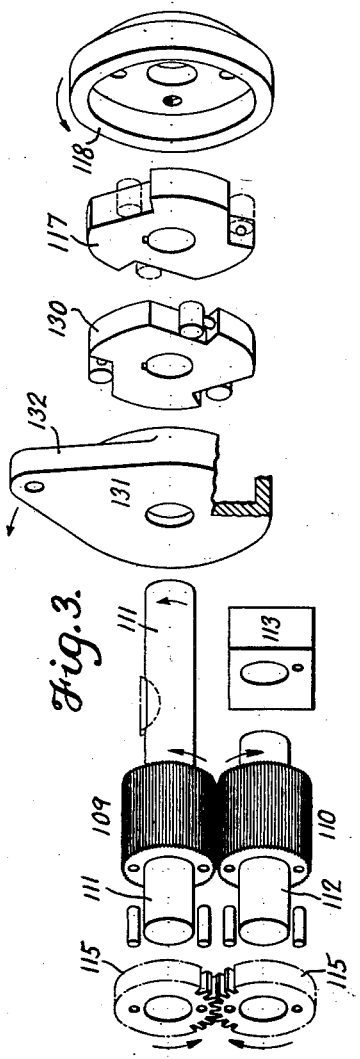

Feb. 14, 1933. V. ANDERSON ET AL 1,897,460
GRID MAKING MACHINE AND METHOD
Filed Nov. 16, 1929 11 Sheets-Sheet 3

Inventors
V. Anderson
&
D. G. Trutner.
By Morrison, Kennedy
& Campbell,
ATTORNEYS.

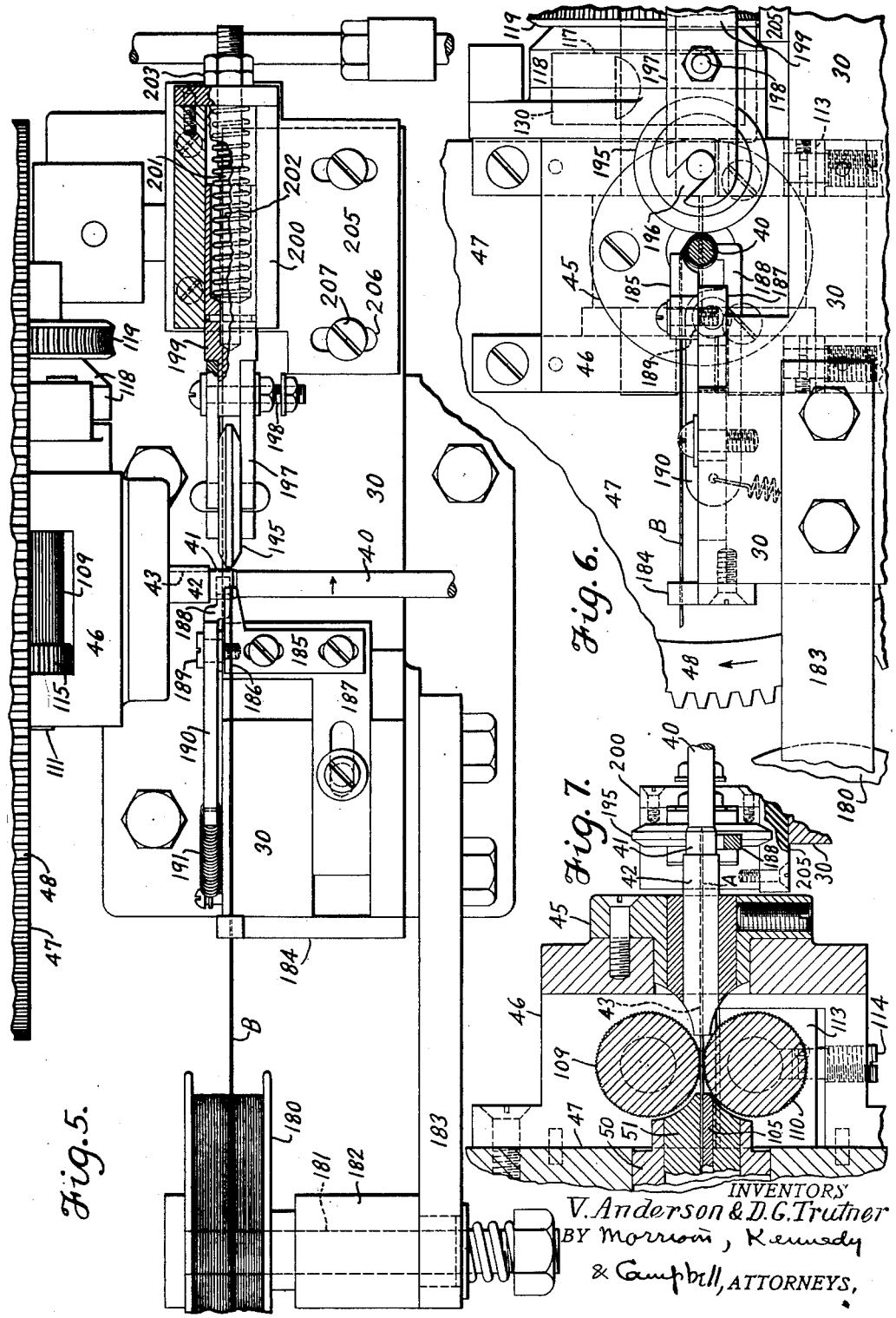

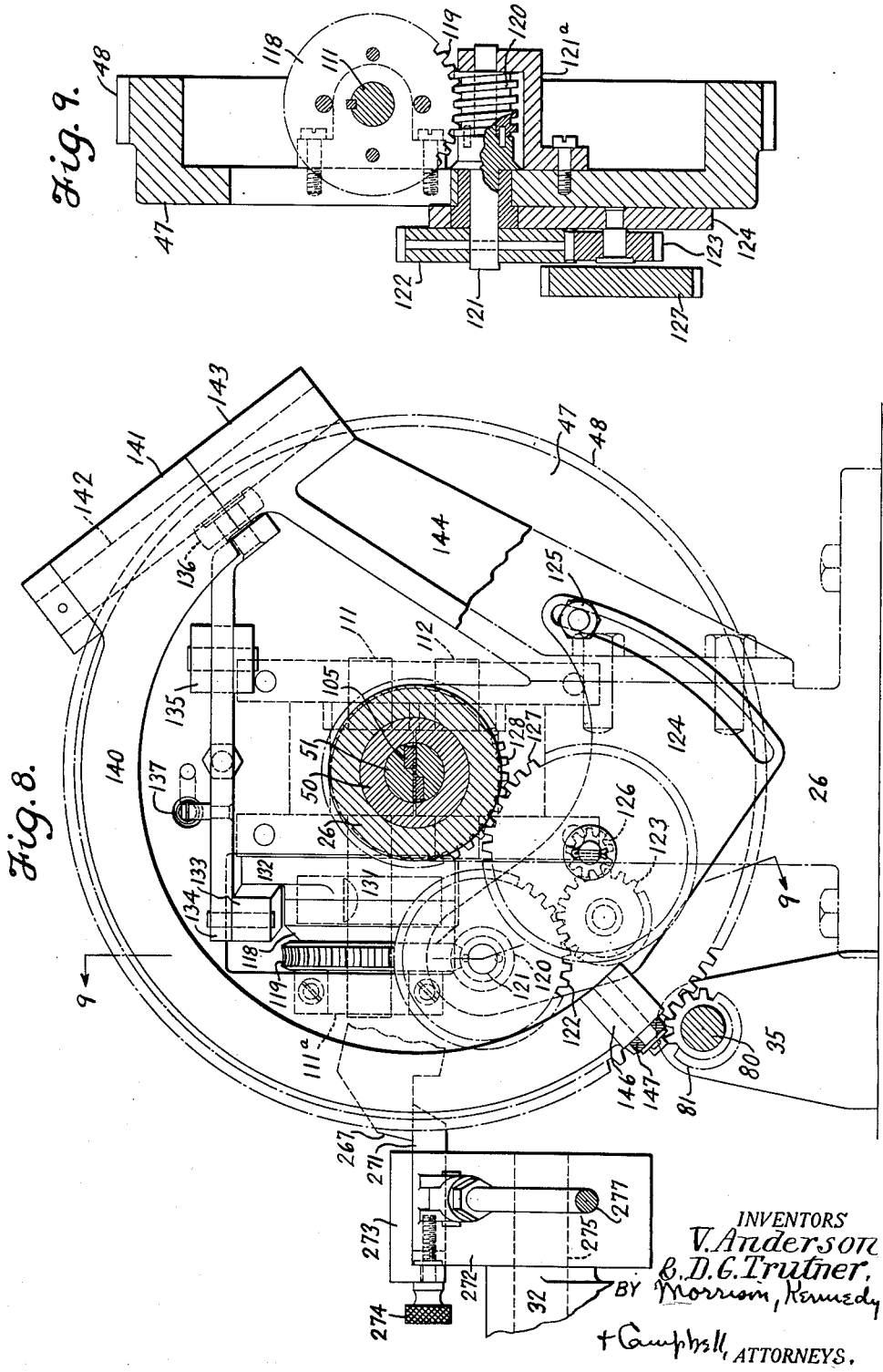

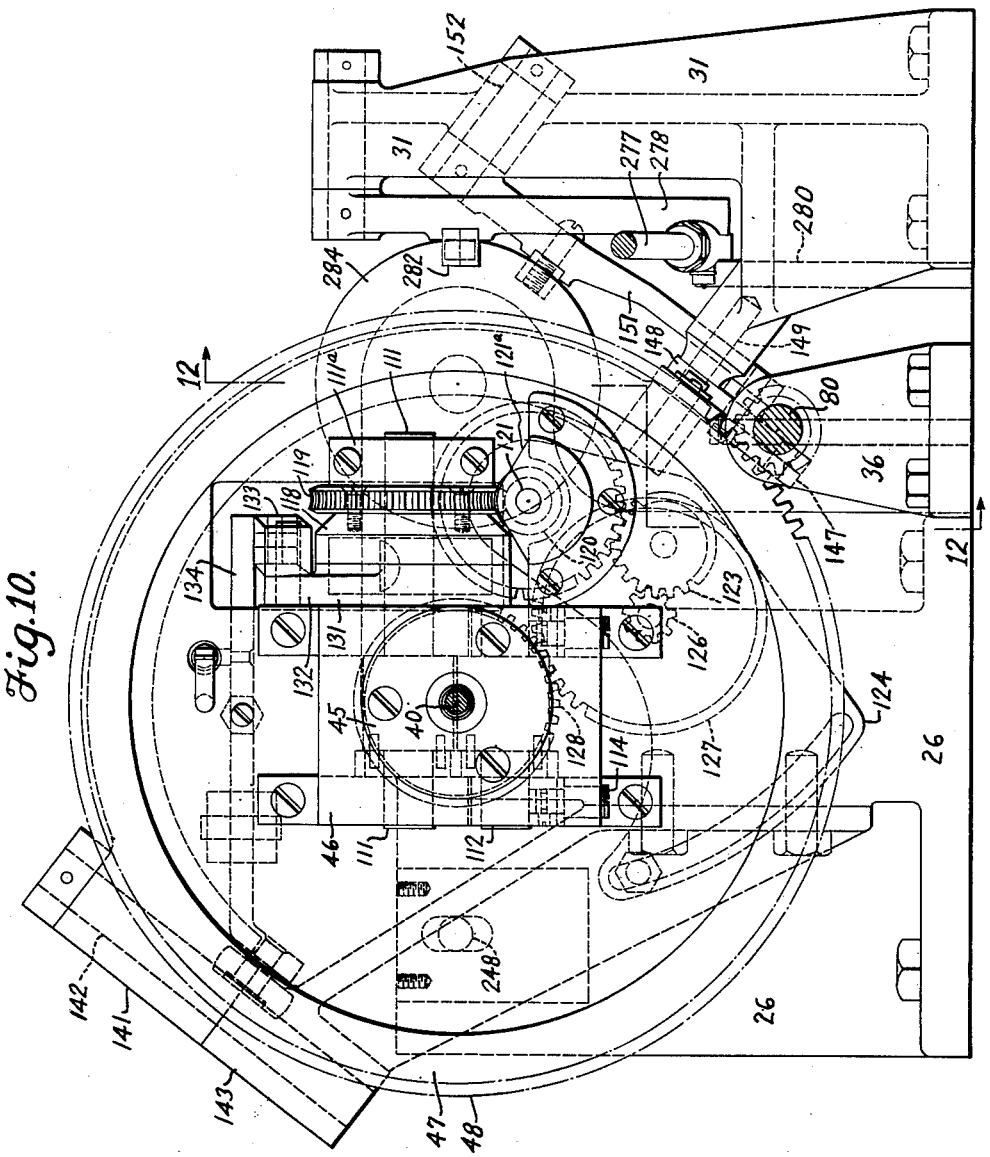

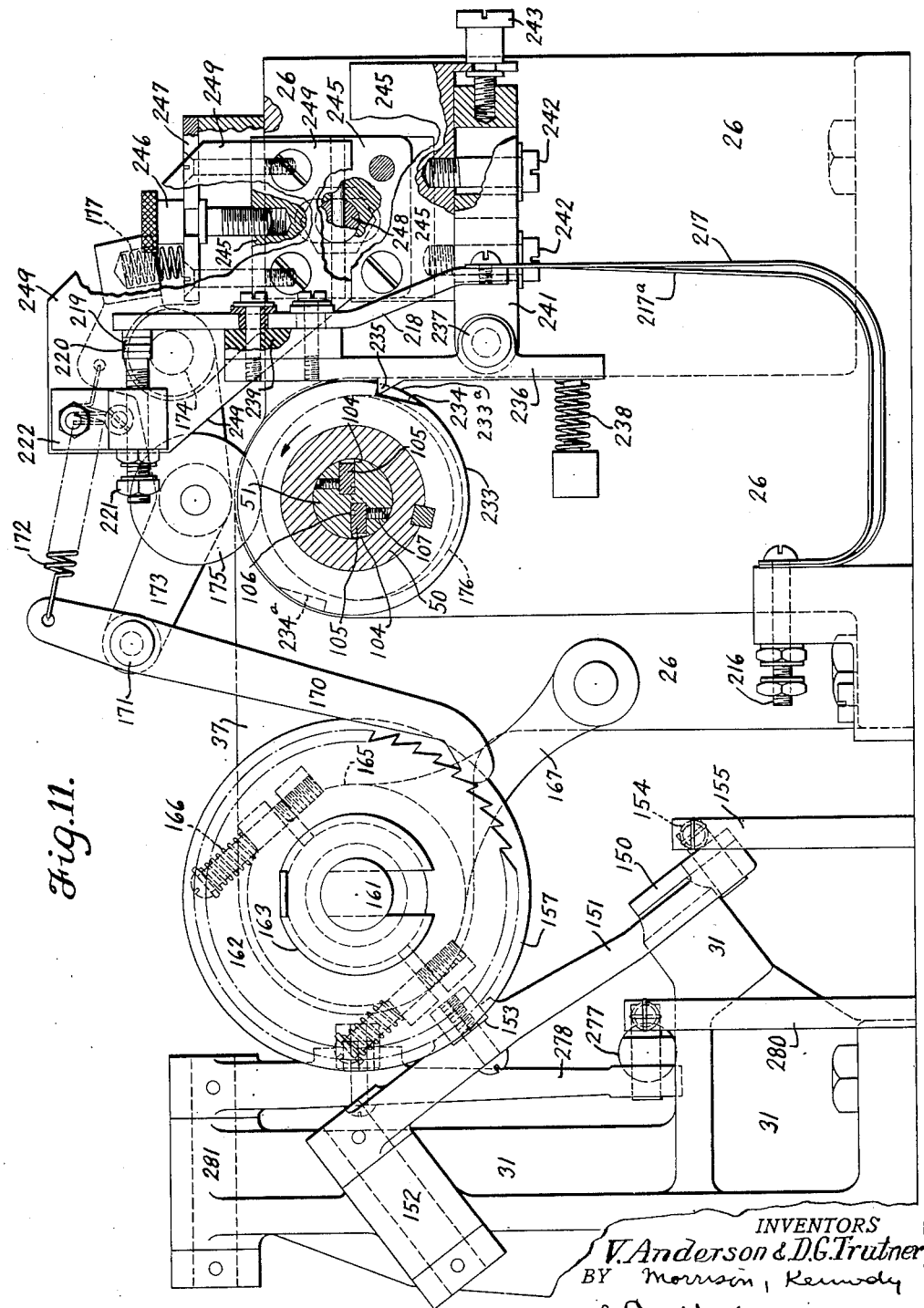

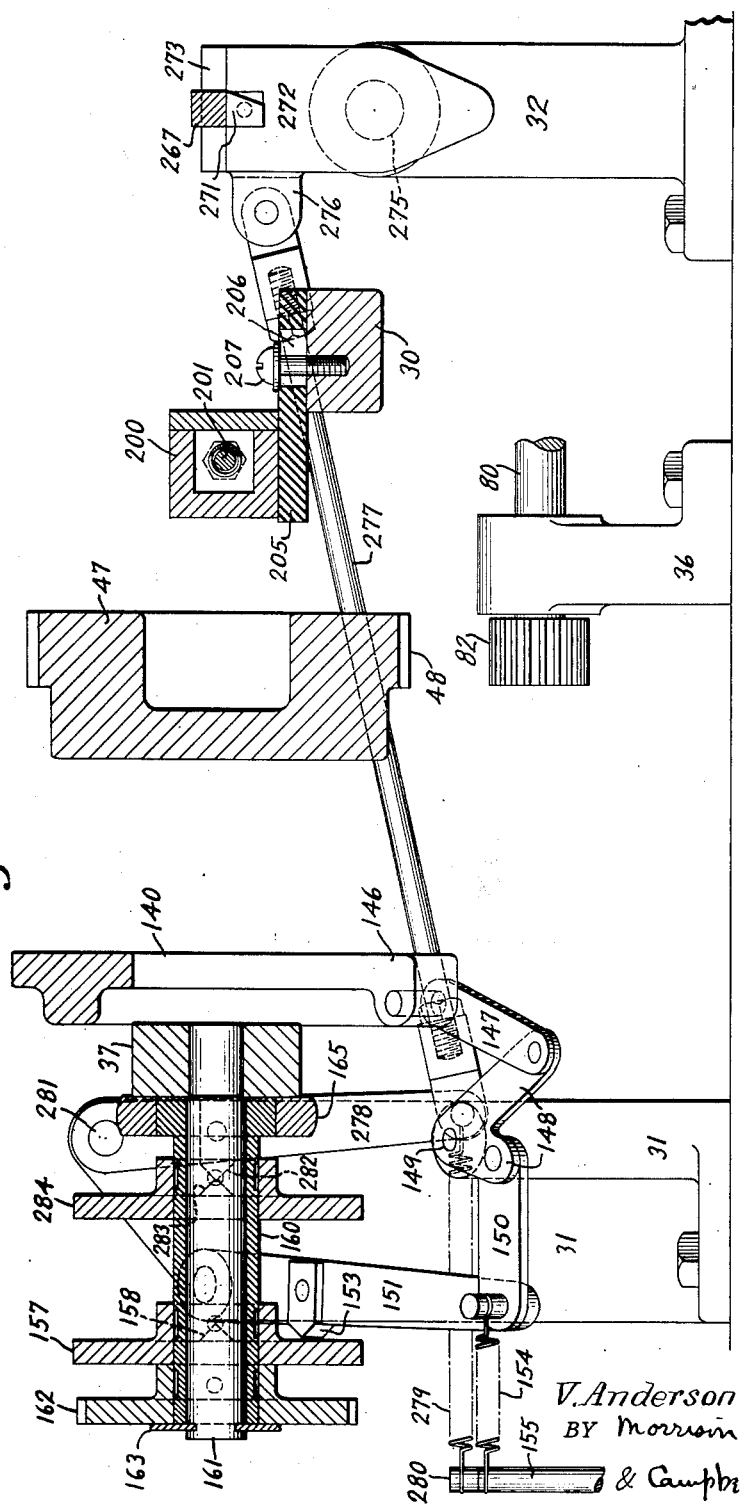

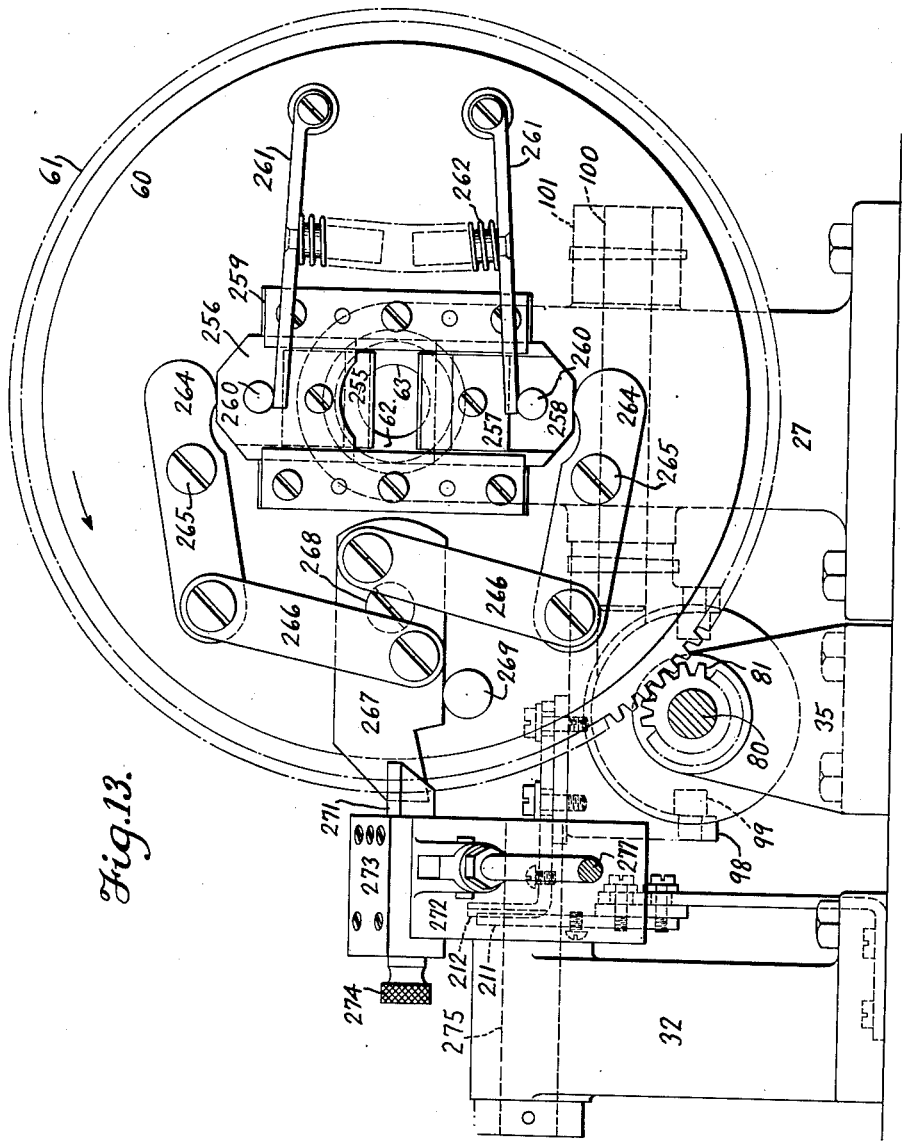

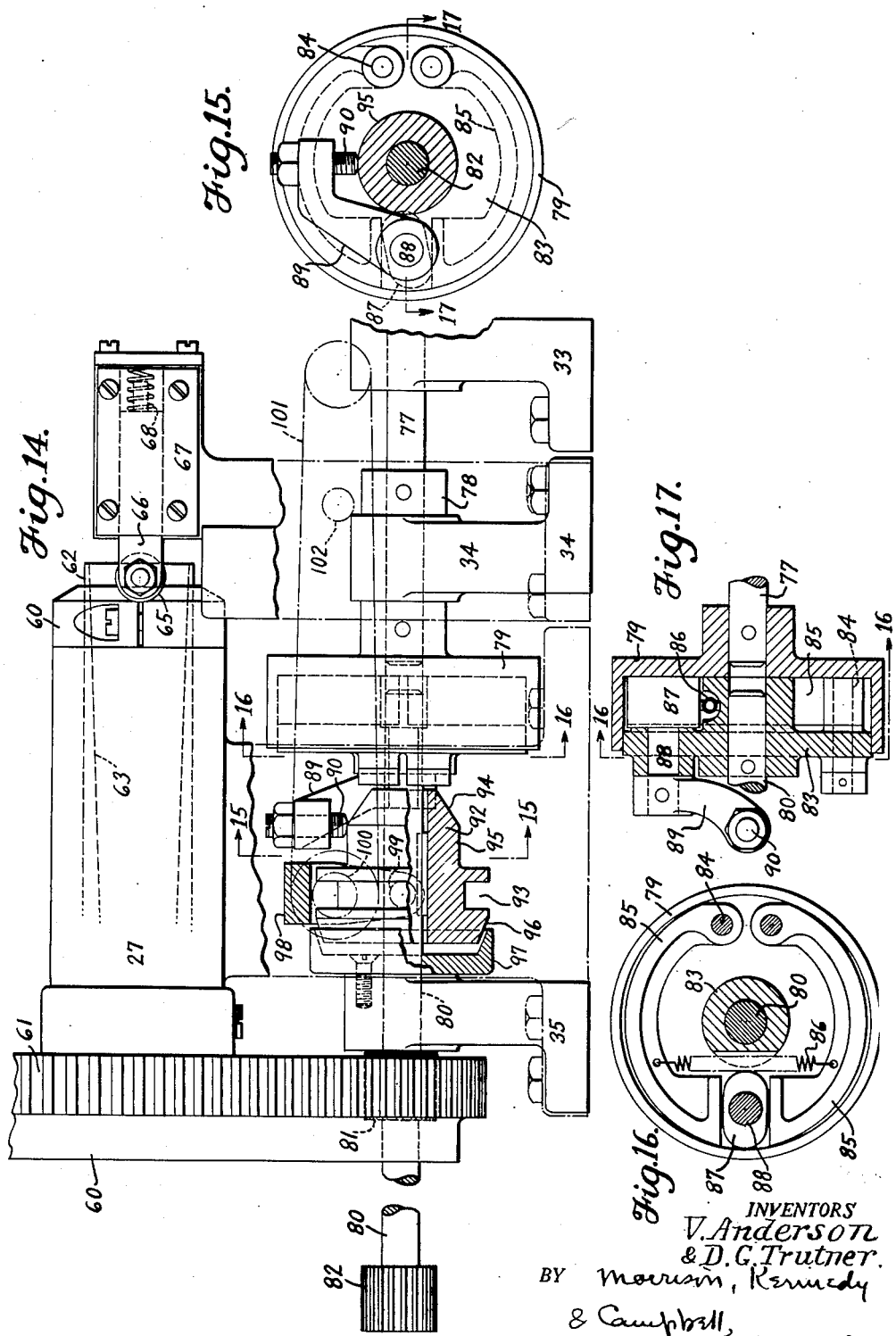

Feb. 14, 1933. V. ANDERSON ET AL 1,897,460
GRID MAKING MACHINE AND METHOD
Filed Nov. 16, 1929 11 Sheets-Sheet 11
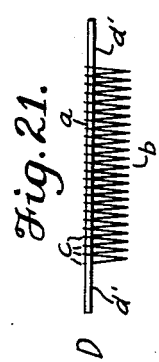
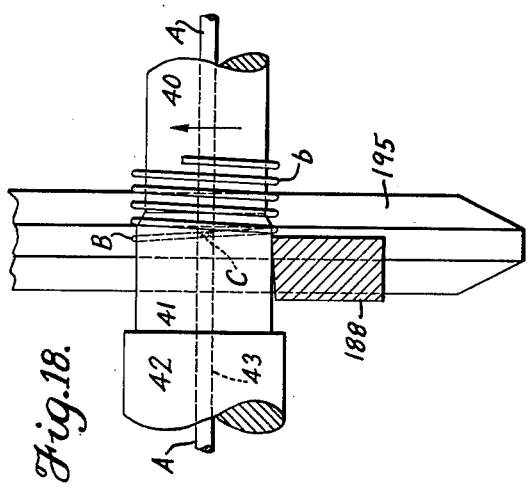
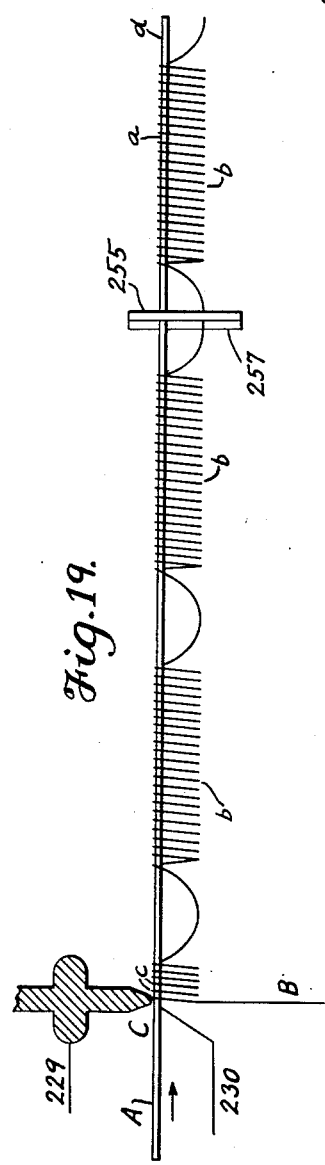
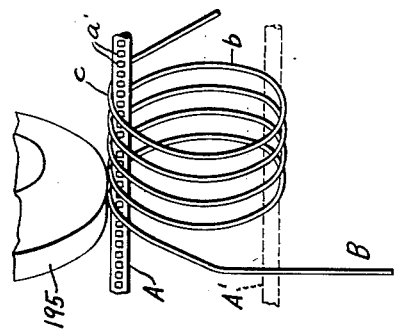
INVENTORS
V. Anderson
&
D. G. Trutner
BY Morrison, Kennedy
& Campbell, ATTORNEYS.

Patented Feb. 14, 1933

1,897,460

UNITED STATES PATENT OFFICE

VICTOR ANDERSON, OF PASSAIC, AND DONALD G. TRUTNER, OF NORTH ARLINGTON, NEW JERSEY, ASSIGNORS TO ALFRED HOFMANN & COMPANY, OF WEST NEW YORK, NEW JERSEY, A CORPORATION OF NEW JERSEY

GRID MAKING MACHINE AND METHOD

Application filed November 16, 1929. Serial No. 407,707.

This invention is a novel grid making machine and method, adapted for the manufacture of the wound type of grid electrode as embodied in thermionic valves or audions employed in the radio art and otherwise.

A prior example of a grid making system is shown in the patent of H. S. Coyer, 1,305,690 of June 3, 1919, which discloses the principle of feeding longitudinally the relatively heavy wires or rods which are to constitute the supporting ports or rods of the grids while winding the finer grid wire into its desired shape, and uniting or welding each convolution of the grid to the supporting rods during its formation, the resulting wind and grid being of round, flat or other form; and the outgoing product to be severed into separate grids of desired length. While however the present invention embodies largely the principles disclosed in the prior patent, the features of improvement herein are not intended to be limited to use with the disclosure of the prior patent as they may be otherwise used.

The general object of the present invention is the improvement of the accurate and uniform manufacture of grids of perfect construction and with a large rate of output. A particular object is the successive formation of individual grids spaced amply from each other along the supporting rod or rods, this being attained by means of a quick, extra or skip feed of the rod between the formation of the successive grids, which leaves, when severed, clean rod extensions for mounting the grids. An important purpose is to afford a continuous process, with which the grid structure and individual grids are produced continuously, without the periodic interruptions of the intermittent or batch system as now practised. While welding is preferred, this is intended to include equivalent uniting of the contacting wires by application of heat or electricity at the intersection thereof, or a mechanical uniting may be used as by swaging, shaping or crimping one of the wires to grip or lock with the other.

A further object is to afford improved means for feeding the heavier wires or rods which are to constitute the supporting posts or rods, referring both to the normal or grid winding feed and the intermittent or skip feed thereof, and the shift from one to the other.

Other objects include the general improvement of the organization and arrangement of mechanisms of a grid making machine, and the improvement of its several mechanisms including that for severing the individual grids issuing from the machine. Other and further objects and advantages of the present invention will be pointed out in the hereinafter following description of an illustrative embodiment thereof or will be understood to those conversant with the subject.

To the attainment of such objects and advantages the present invention consists in the novel grid making machine and method, and the novel features of operation, combination, construction and arrangement herein illustrated or described.

The figures on the accompanying eleven sheets of drawings are described as follows.

On sheet 1, Fig. 1 is a general top plan view of the complete machine, partly broken away at the left end for condensation, and supplemented by a diagram of the electrical part of the apparatus.

On sheet 2, Fig. 2 is a front elevation of the apparatus shown in Fig. 1 without the electrical connections. Fig. 3 is a perspective elevation looking from the front and right of the rod feeding rolls, their shafts and driving connections.

On sheet 3, Fig. 4 is a substantially central vertical section, looking from the front, of the middle portion of the machine.

On sheet 4, Fig. 5 is a partial top plan view showing particularly the parts at the winding and welding points and to the rear and front thereof. Fig. 6 is a partial right elevation of the mechanism shown in Fig. 5. Fig. 7 is a central vertical section corresponding substantially with a portion of Fig. 4, but on a larger scale and indicating additional details.

On sheet 5, Fig. 8 is a transverse vertical sectional view taken on the line 8—8 of Fig. 10

1 and looking from the left. Fig. 9 is a vertical section taken on the crooked line 9—9 of Fig. 8, looking from the front.

On sheet 6, Fig. 10 is a right elevation with certain parts taken in section substantially on the transverse plane 10—10 of Fig. 1.

On sheet 7, Fig. 11 is a partial left elevation with certain parts shown in section taken substantially on the transverse line 11—11 of Fig. 1 and with parts broken away to show interior construction.

On sheet 8, Fig. 12 is a longitudinal vertical section view taken generally on the line 12—12 of Fig. 1 or substantially on the line 12—12 of Fig. 10.

On sheet 9, Fig. 13 is a left elevation of certain parts including the cutting mechanism, taken partly in section on the transverse line 13—13 of Fig. 1.

On sheet 10, Fig. 14 is a front elevation of the right or tail end of the machine, with certain parts broken away to show other parts to the rear. Fig. 15 is a left elevation taken partly in section on the section line 15—15 of Fig. 14. Fig. 16 is a left elevation similar to Fig. 15, but taken on the line 16—16 of Fig. 14. Fig. 17 is a horizontal section taken on the line 17—17 of Fig. 15, but with the follower lever shown in full.

On sheet 11, Fig. 18 is a detail front elevation at the winding and welding point on enlarged scale. Fig. 19 is a diagrammatic top plan view of the several operations or process carried out on the machine of Figs. 1 to 18. Fig. 20 on a larger scale shows in detail the construction of a portion of the product or grid, a single longitudinal wire or rod being indicated in full lines but with a second such rod indicated in dotted lines as a modification. Fig. 21 is a side view of the ultimate product or grid after delivery from the machine and after manual trimming of the loose or free wire ends.

Referring first to Figs. 19 to 21, the longitudinal rod or post wire A (or wires A and A") is fed from the left or head end of the machine rightwardly while the grid or helix wire B is fed from the front rearwardly to the welding point C. At this point the helix wire is wound about an arbor on which the post wire advances while the welding means effects a series of welds c. The steady forward travel of the post wire A is periodically interruped by a sudden or skip feed of substantial extent so that the winding is separated into a series of successive helixes b, each pertaining to a single grid, and connected by a loose unwelded portion of helix wire. Substantially beyond the welding point a severing or cutting action is performed dividing the post wire A into single lengths a each carrying a helix b and a loose end of helix wire, which is also severed in the same operation and has only to be manually trimmed to give the final product or grid D, comprising the rod or post a carrying the wound helix b, secured together at the weld points c, and with projecting rod ends d of desired lengths as required in the mounting of the grid in the audion. The general relation of the longitudinal or post wire A and the helix b is indicated in Fig. 20 wherein it is shown that the small notches or indentations a' made by the grip of the longitudinal feeding means have no relation to the convolution of the helix, nor to the welding points, which latter are intended to be spaced according to adjustment and without respect to the indentations.

The machine is shown as built upon a solid bed 25 having near its left end a headstock 26 constituting also the left bearing for the main rotating parts. Toward the right end is the tailstock 27 constituting a right hand bearing. At the left end is shown a bracket extension 28 carrying a bearing 29 for a rotary frame to be described. Between the head and tailstocks is a transverse upright standard 30 supporting the means for feeding the helix wire, and the welding means. Other standards and fixed brackets include standard 31 for certain levers, standard 32 for the cutter trip mechanism, standards 33 and 34 constituting bearings for the power shaft and standards 35 and 36 constituting bearings for the drive shaft adapted to be clutched and unclutched from the power shaft.

Describing next the rotating parts at the head end of the machine we refer first to the arbor or mandrel 40 upon which the grid is wound. The elongated section of this arbor as seen in Figs. 1 and 2 is a guiding section conducting the wound grids toward the right where they are fed to the severing and delivery mechanisms. The winding arbor is an interchangeable element in the machine since it may be desired to alter the diameter of the product. As seen more clearly in the enlarged views Figs. 4, 5 and 7, the winding arbor has, to the left of the section 40, a winding section 41 of slightly larger diameter and beyond that a still larger section or shank 42. To accommodate the advancing post wire A the arbor sections 41 and 42 are formed with a groove 43 indicated in dotted lines in Figs. 5 and 7. This is an open groove and delivers from the winding section 41 directly on to the surface of the section 40. In a case where the grid is to have two supporting wires or posts, as indicated in Fig. 20 the arbor will be formed with two opposite grooves.

The winding arbor 40 is rotatably and centrally supported by its engagement within a sleeve 44 which in turn it held centrally within a flanged sleeve member 45 secured at the right face of a hollow or box member 46 which bridges the feed rolls to be later described and is attached to the web or disk portion of a revolving disk or turret 47, the peripheral rim of which is formed with gear teeth 48 by which the described assemblage may be continuously rotated from the drive shaft to be described.

To facilitate the welding action the winding or welding section 41 of the arbor may be recessed and the recess occupied by a plug 41ª of a special metal such as elkonite constituting an advantageous contact or electrode material, in which metal the shallow groove 43 is formed, and this metal being such as not merely to insure a clean and effective conducting contact, but to preclude possibility of the metal of the arbor adhering to the post wire of the grid.

The head turret 47 is shown secured to and rotating with a hollow shaft 50 revolving within the standard or bearing 26 and accommodating in its interior a cylindrical core 51 having a particular construction, to be described, for guiding the post wire A to the groove 43 of the arbor. At its left end the hollow shaft 50 carries a rotary frame 53, the left end of which is formed into a projecting stud or shaft 54 engaging in the bearing 29 on the extension bracket 28. The frame 53 is an outline structure for containing the supply of post wire, and is provided with a transverse ring or hand wheel 55, for rotating the machine by hand, as when setting it for operation. Inside of the frame is shown a spool 56 carrying a supply of post wire A and beyond this may be a second spool 57, each spool being removably mounted on the frame by bearing devices 58. By this arrangement the entire supply of post wire is rotated along with the rotation of the head turret, the feeding devices, and the winding arbor. The bearing devices are conical and adapted to impose retarding friction, adjustable to prevent overrunning of the spool by momentum.

At the right hand or tail end of the machine is shown a turret or disk 60 generally similar to the turret or disk 47, and having a toothed portion 61 by which it is driven. The structure is shown on an enlarged scale in Fig. 4 where it is seen that the turret 60 is mounted upon a shaft 62 turning in the standard or bearing 27. The shaft 62 is hollow, having a flared passage 63. The turret 60 carries the cutting devices for severing the product into separate grids, these grids being thus delivered centrally into the passage 63, and feeding to the right by reason of the flared shape of the passage.

The tail shaft 62 extends rightwardly beyond the bearing 27 and is there provided with a holding collar 64 as seen in Figs. 1, 2 and 14. This collar will usually be attached as illustrated, with the rotary parts held snugly in the bearing 27. It may be desirable however to change the relation of the parts in order to shift the cutting plane and thus alter the relative lengths of the projecting post ends d shown in Fig. 21. For this purpose the collar 64 may be loosened on the shaft 62 and shifted rightward to give an appreciable amount of end play. This play is then taken up by means of a pressure device comprising a conical roller 65 mounted on a shank 66 slidable toward the left and right within a guide or box 67, the latter containing a strong spring 68 by which the roller is pressed toward the left and the collar 64 thus held in contact against the bearing 27.

The completed grids issuing from the right end of the hollow shaft 62 may pass down along an inclined chute 70 and be thus delivered into a receptacle 71.

The drive means for the rotary parts will now be described. It is arranged to drive the two turrets 47 and 60 through their gears 48 and 61 in perfect unison with each other so that the cutting mechanism, during its action, will partake of the same rotary movement as the winding and feeding devices. The source of power may be an electric motor 73 controlled by any suitable switch. The motor pulley 74 is connected by a belt 75 with a pulley 76 on a power shaft 77 rotating in the standards or bearings 33 and 34 as best seen in Figs. 1, 2 and 14. The shaft 77 has a collar 78 in contact against the bearing 34 and to the left of the bearing a collar or hub carrying the driving clutch member or drum 79 which is shown also in the detail Figs. 15, 16 and 17, this clutch member consisting of a web or disk and a peripheral rim within which the clutching is effected.

In line with the power shaft 77 is a driving shaft 80. This takes its bearings in the standards 35 and 36 and carries a pinion 81 engaging the gear 61 of the tail turret and a pinion 82 engaging the gear 48 of the head turret, so that the rotation of the drive shaft causes the uniform and synchronous rotation of the rotary elements at the head and tail of the machine.

The clutch between the power and driving shafts comprises the clutch member or drum 79 already mentioned, and a clutch disk 83 on the drive shaft, this carrying pins 84 extending into the drum 80 and these pins carrying the opposite clutch or friction shoes 85 arranged for internal expansion against the drum rim to clutch the two shafts together. A spring 86 opposes the expansion and tends to draw together the two friction members.

The operation of the clutch is shown as effected by an elliptical cam or spreader 87 mounted on a short shaft 88 turning in the disk 83 and carrying externally a clutch lever 89 having an adjustable contact screw or stud 90 intended to be forced radially outward for the purpose of turning the spreader and applying the clutch.

The closing and opening of the clutch 79, 83 is shown as effected by a clutch shifter 92 splined upon so as to rotate with the drive shaft 80, as best seen in Fig. 14. The clutch shifter has a peripheral groove 93 for moving it axially along the shaft. At its right end the shifter is formed with a conically tapered portion 94 adapted to force outwardly the clutch lever 89 when the shifter is moved to the right, followed by a cylindrical portion 95 holding the parts in clutched position. At is left end the shifter is formed with a conical portion 96 arranged to engage a hollow cone or braking element 97 mounted against rotation on the standard 35, so that when the shifter is thrust to the left a braking effect occurs which tends quickly to stop the rotation of the shifter and thereby the drive shaft and the parts driven thereby, the clutch first opening before the brake is applied.

In order to move the shifter right and left at will there is shown a yoke 98 having studs 99 extending into the groove 93 of the shifter. This yoke is mounted on a transverse shaft 100 extending to the front of the machine and there carrying a controlling lever or handle 101. When the lever 101 is in its horizontal position as shown the clutch is engaged and the drive shaft is being rotated, but when the handle is thrust downwardly this moves the clutch shifter to the left disengaging the clutch and applying the brake. A latch or device 102 may be employed to retain the control handle in its lifted or horizontal position.

Referring next to the travel of the post wire from the supply to the feed means and mandrel, the wire may pass from the spool 56 into the left end of the hollow shaft 50. Within the shaft 50 is the grooved core 51 already mentioned, and which may be removed and replaced for interchanging the interior devices. The post wire passes through a channel in the core which channel is not central, but is offset to the same extent as the groove 43 in the winding mandrel. When two post wires are used they will pass through two symmetrically opposite channels in the core, and thence to corresponding grooves in the mandrel. The channels may be formed as follows, referring to Fig. 11. The core 51 is shown as formed with opposite longitudinal grooves 104, each of them containing a bar 105 having a channel 106 of the correct size and position for the post wire to be used. Each bar is removable and interchangeable for a bar having a channel of different size or position. Each of the channels 106 is just sufficiently large to receive and guide the post wire, and to straighten it on its path to the arbor or mandrel. Each bar is held in position by a screw 107, and the conveying channels are straight and axial, and in exact line with the post-wire feed means and with the arbor grooves, so that the wire has no bend to travel between the channels and winding point.

The post wire is thus conveyed longitudinally through the hollow shaft 50 and groove 106 in the core 51 and thence delivered from the open end of such groove within the turret 40. The post wire feeding means preferably comprises methodically rotated feed rolls 109 and 110 placed in opposition to each other and having serrated or burred surfaces to give a grip upon the wire or wires, leaving indentations $a'$ as seen in Fig. 20. The feed rolls are contained within the box or bridge member 46 and partake of the general rotation of the turret 47. The rolls may be referred to respectively as the upper 109 and lower roll 110, it being understood that these are not permanent positions. The upper roll 109 is mounted on a transverse shaft 111 which extends through and takes its bearings in the sides of the box casting 46, the rear end being substantially extended and supported in an additional bearing 111$^a$. The lower roll 110 is mounted on a short shaft 112 which may have separate bearings in a casting or block 113 adjusted and held by screws 114 so that the spacing of the feed rolls may be regulated.

The relative arrangement of the rolls and shafts is shown perspectively in Fig. 3 wherein are also shown meshing pinions 115 mounted at the left ends of the shafts, so that the feed rolls are compelled to turn in unison and in opposite directions. The feed rolls define a feed recess or passage which is transverse to the general axis and is straight so that the feed operates with any spacing of the post wires; and the gripping points on the wire are at the lateral sides thereof and not at the exterior side whereat the welding later occurs.

In the normal operation of the machine the feed rolls are turning at a uniform speed so as to advance the post wire or wires along through the grooves in the mandrel to the welding and winding point. This operation is interrupted periodically to give a skip or jump feed as already mentioned. The connections for affording the slow or normal feed of the post wires may include a train of gears wherein is a one-way device or overrunning clutch in the nature of a pawl and ratchet, so that notwithstanding the steady drive of the feed rolls their rotation may be periodically expedited by the independent skip feed connections.

The train of connections for the normal rotation of the feed rolls are shown as including a driven clutch member 117 keyed to the shaft 111 and surrounded by a driving clutch member 118. These members 117—118 constitute a one-way drive device, the former having tapered recesses in its periphery engaged by rolling or wedging elements, so that the rotation of the driving member may rotate the driven member, but will not preclude the latter overrunning. These parts are shown in Fig. 3 and the further connections in Figs. 4, 5, 8, 9 and 10.

The train of connections for rotating the drum or rim member 118 of the normal feed roll clutch include a worm wheel 119 attached to the member 118 and engaged by a worm 120 mounted on a longitudinal shaft 121 extending through the turret or disk 47 and at its left or outer end carrying a gear 122. The gear 122 is shown engaging a pinion 123 which is mounted upon a segment 124 swingable about the shaft 121 and having a set screw 125 for securing it in adjusted position. Also carried on the segment 124 is a pinion 126 which engages the pinion 123 and is attached to a gear 127. The gear 127 in turn meshes with a fixed central gear 128 surrounding the shaft 50 and attached to the standard or bearing 26.

From this arrangement it will be seen that the rotation of the feed rolls is derived from the fixed central gear 128 through the train of gears 119 to 127 by reason of the rotation of the turret, the gear 127 planetating about the fixed gear 128 and communicating its rotation steadily to the clutch member 118, which normally turns the feed rolls at their slow uniform speed. The purpose of the swinging segment 124 is to permit interchange of gears to alter the feed rate, or the ratio between the feed and the winding action so as to vary the pitch of the helix of the grid as may be desired. For this purpose it is only necessary to remove the gear 127 from the segment 124 and replace it by a gear of different pitch diameter and then readjust the segment until such gear properly meshes the gear 128.

The train of skip feed connections may be described commencing with the clutch member 130 similar to 117 and similarly keyed on the feed roll shaft 111 as indicated in the perspective view Fig. 3. A driving clutch member 131 has a rim cooperating with the driven member 130 and the wedging elements or rollers between them. Unlike the driving clutch member 118 the member 131 does not rotate continuously or uniformly and in fact has a mere oscillating movement at intervals following the completion of winding of each grid. To give a leftward oscillating movement at relatively high speed, the member 131 is formed with an outstanding arm 132. When this arm is pulled leftward the clutch 130, 131 advances rapidly the feed rolls and post wire, causing them to overrun the other clutch 117, 118.

The connections for oscillating the skip clutch arm 132 are shown as comprising a jointed link 133 which extends through a large opening in the turret 47 to an exterior point at the left of the turret where the link is pivoted to a lever 134 as best shown in Figs. 1, 4 and 8. The lever 134 is fulcrumed to a projection 135 at the left side of the turret and is extended beyond its fulcrum to where it carries a roller 136. By forcing the roller to the right the lever will be swung to operate the skip clutch, and a spring 137 is arranged to restore the parts to normal position.

The swinging of the lever 134 to operate the skip clutch is effected by a cam mechanism that is normally inoperative but is adjusted to operative position at the time the skip feed is to be effected. A convenient arrangement for this purpose is the provision of a cam 140 having the shape of an arc, preferably a half circle and arranged to be shiftable from its inoperative position shown in Figs. 1 and 4 to its operative position as indicated in dotted lines in Fig. 4. The upper forward part of the arc cam 140 is formed into a boss 141 through which passes a pivot bolt 142 secured into the head 143 of a fixed bracket 144 mounted at the front side of the standard 26. When the cam surface of the cam 140 is in a fore-and-aft plane it will have no effect on the cam lever 134, but when the lower rear end of the semi-circular cam is swung to the right the cam will become operative and the lever, on the following rotation of the turret 47 will be swung, due to the travel of the cam roller 136, around the now inclined arc cam.

The adjustment into and from operative position of the arc cam 140 may be effected by the following means. The free or swinging end of the cam is formed into a head 146 to which is pivoted a link 147, as seen in Fig. 4, this link connecting to a bell crank lever 148 best seen in Fig. 12. The bell crank is fulcrumed at 149 on the standard 31 and is connected by a link 150 with a cam lever 151 shown also in Figs. 10 and 11. The swinging of the lever 151 to the right and left will cause the arc cam 140 to swing into and from operative position.

The cam lever 151 is fulcrumed at 152 on the standard 31, as seen in Figs. 10 and 11, and at a midway point is provided with a cam surface or button 153 cooperating with the cam to be described. The lever is pulled leftward by a retracting spring 154 extending from the free end of the lever to a vertical post 155.

The cam for operating the lever 151 is shown as comprising a disk 157 having at one point a sharp rise or button 158 adapted, in one intermittent advance of the cam, to cooperate with the button 153 and thus throw the lever 151 to the right. The cam is preferably operated in a step by step manner so that on a single step thereof the shift of the arc cam to operative position will be effected, it being understood that the roller 136 may be in the act of traveling around the arc cam while the latter is in the act of shifting, so that in effect the operation of the disk cam 157 is directly to swing the cam lever 184 and bring about the skip feed.

The mountings of the step by step cam 157 may be as follows. It is shown keyed to a sleeve 160 which is rotatable upon a stud or axle 161 mounted on an extension 37 of the standard 26 and projecting to the left. At the extreme left end of the rotary sleeve 160 is shown a ratchet wheel 162, this being held in place by a removable washer 163 to permit interchange of ratchet wheels in accordance with the number of convolutions desired in the grid. Being rotated by ratchet it is desirable to prevent overrunning of the sleeve and the latter at its enlarged right is shown engaged by a friction band 165 which may be tightened by an adjusting device 166, seen in Fig. 11, and is anchored by a radial arm 167.

The actuation of the ratchet wheel 162 is by a dog or pawl 170 which may for example be mounted as best indicated in Fig. 11. The pawl is in the form of an oscillating lever pivoted at 171 and beyond the pivot having a spring 172 which holds the pawl to the ratchet. The pawl is pivoted on a cam lever 173 which has a fixed fulcrum at 174 on the standard 26 and this cam lever carries a roller 175 engaging the periphery of a cam 176 keyed to the hollow shaft 50 which carries the turret 47. A compression spring 177 lifts the forward extension or tail of the cam lever 173 so as to keep the cam roller in engagement upon the cam. The cam preferably has a rise at one side only so that each complete rotation of the shaft and turret effects a single operation of the cam lever and an advance of the ratchet wheel 162 to the extent of one or more teeth as desired, in accordance with the number of convolutions desired in the helix of each grid.

The supply of helix wire B is contained on a spool 180 mounted on a removable spindle 181 carried in a supporting head 182 on a forwardly extending bracket 183 attached to the standard 30 as shown in Figs. 1, 2, 4, 5 and 6. At the front side of the standard is shown a plate 184 having a guide eye directly in front of the winding point. The helix wire passes from the spool through the eye in plate 184 and thence rearwardly to a plate 185 having a fore-and-aft groove 186 in which the wire is laid, the plate having a rearward extension or nose substantially to the arbor and winding point, so that the helix wire passes tangentially from such guide means to the winding portion 41 of the arbor. Fine adjustments are permitted as follows. The grooved plate 185 is adjustable longitudinally on an angle plate 187 by means of slots and screws, and the angle plate is adjustable transversely in a recess at the top side of the standard 30, held by a set screw.

It is important that the helix wire being wound shall advance longitudinally so as to pass promptly off of the winding section on to the reduced diameter section of the arbor. For this purpose a guard or bar 188 is arranged to contact the underside of the arbor at its winding section closely adjacent to the point where the convolutions slip off to the reduced section. This guard is shown in Fig. 18 where its upper side is indicated as slightly beveled so as to give a close contact at the upper right corner and prevent convolutions of helix wire from working their way between the arbor and guard. The guard is arranged to yield downwardly and for this purpose is mounted to swing on a fulcrum 189 at the left side of the plate 187. The guard has a forward extension 190 beyond the fulcrum, and a spring 191 pulling down so as to force the guard yieldingly upward. This yielding action is necessary to permit the post wire to pass around above the guard, as such wire is intended to project somewhat outwardly from the surface of the winding section of the arbor.

The uniting of the convolutions of the wound helix to the post wire is preferably by welding and is shown as effected by means of a contact wheel 195 arranged directly opposite to or rearward of the point where the helix wire is supplied to the arbor. The welding wheel may rotate and thus minimize wear at one point. It is so spaced as not to contact the helix wire except adjacent the point where the helix wire overlies the outstanding post wire. At the moment the post wire comes opposite to the welding wheel contact will be formed, and under control of a timing device, will deliver a heavy current instantaneously fusing and uniting the post and helix wires. The principle is the same when only one post wire or two opposite post wires are used.

For ready removal and replacement the welding wheel 195 is shown as having its projecting studs rotating within open recesses 196 in a pair of side bars 197 between which the wheel is confined. These bars are metallic and are secured by a cross bolt 198 to a slidable shank 199, the bolt also constituting a binding screw for one of the circuit conductors. The shank 199 slides adjustably forwardly and rearwardly in a box or slideway 200. Attached to the shank is a rod 201 threaded at its rear end. The rod is surrounded by a spring 202 pressing forwardly on the shank and thereby holding the weld wheel yieldingly in welding position. The threaded rear end of the rod 201 extends through the slide box 200 where it is provided with lock nuts 203 permitting fine adjustment of the position of the welding wheel.

These several elements 195 to 203 are carried bodily upon an insulating plate or support 205 which in turn is mounted on top of a portion of the standard 30, the plate having longitudinal slots 206 by which the plate is adjustably secured to the standard by screws 207, so as to permit longitudinal adjustment of the welding wheel. Thus fore-and-aft and longitudinal adjustments are possible; vertical adjustment is not necessary on account of the large diameter of the welding wheel.

The welding circuits are sufficiently indicated in Figs. 1, 2 and 11. Preferably an ordinary commercial current is employed as a primary with an inductive transformation to a low voltage high current secondary delivered to the welding wheel. For example, Fig. 1 shows line wires 210 and 227, the former connected to a contact or brush 211 which is removably contacted by a second contact or brush 212. The first of these may be fixed and the second mounted on the shaft 100 of the control handle 101 so that when the handle is thrown down to unclutching position the current is broken, thus preventing possible damage from continued current after the machine has stopped. From the contact 212 extends conductor 213 to the primary coil 214 of a transformer, the other terminal of the said coil connected by conductor 215 with a binding post 216 shown in Fig. 1 and at the lower part of Fig. 11. Taking off from the binding post 216 are one or a pair of strip conductors 217 and 217ª, the latter being unnecessary when the grid is to have only a single post. The strip 217 is such that it may oscillate without impairment. It extends forwardly and upwardly to a conducting bar 218, centrally mounted as will be described, and carrying at its upper end the front contact 219 of a pair, the rear contact 220 of which is formed at the front end of a holding screw and binding post 221. The elements 217 to 221 may be duplicated as 217ª to 221ª for the purposes of a second grid post. The posts 221 and 221ª extend through a metallic block 222.

From both binding posts 221 and 221ª extends a single conductor 223 which as seen in Fig. 1 extends to a rheostat 224 from whence a conductor 225 extends to a switch 226 to which also the other line wire 227 connects, thus completing the primary circuit. The timing is at the contacts 219 and 220 which will close and immediately open once in each rotation of the winding mechanism, or in the case of two post wires the closing of the contacts 219ª and 220ª at midway intervals.

The secondary circuit is shown as comprising merely the secondary coil 228 consisting of a small number of turns of heavy wire, one terminal being connected by conductor 229 to the binding post 198 of the welding wheel, and the other terminal by a conductor 230 to a convenient ground point in the machine. By this arrangement, while the welding wheel is in firm contact with a convolution of helix wire, the primary circuit will be closed by meeting of contacts 219 and 220, causing a flash of high current to traverse the secondary circuit and thus effect the welding of the post and helix wires. The contacts 219 and 220 preferably separate before the welding wheel breaks contact with the grid. Alternating current has been assumed; if not available any other method may be used to afford the proper magnitude of current for the welding.

The timing devices pertain preferably to the primary circuit and are shown as controlled by the rotation of the hollow shaft 50 to cause a charge of current at each welding instant. The primary circuit is normally broken at contacts 219, 220, as already stated. In Fig. 11 these contacts are shown in contact and the circuit closed. A timing disk 233 is shown keyed to the shaft 50 and having a timing notch 234 into which drops a dog 235 at each rotation, the dog mounted on upright lever 236 fulcrumed at 237 and having a spring 238 holding the lever to the disk. The upright conducting bar 218, already mentioned, is secured to the forward side of the lever 236, with an insulating plate 239 between them and suitable insulating bushings. The parts 233 to 239 may be duplicated as 233ª to 239ª respectively, with the notch 234ª disposed oppositely to the notch 234, as indicated in Fig. 11, these parts controlling the contacts 219ª and 220ª when a second grid post is to be provided.

The dropping of the lever dog or projection 235 into the notch 234 allows the closing of the primary circuit and thus times the welding action. It is desirable that this be accurately timed and the following adjusting devices are employed. The fulcrum 237 of the lever 236 is carried on a horizontal plate 241 which is vertically slotted to receive vertical screws 242 which can be loosened, while a horizontal screw 243 may be turned to give fore-and-aft adjustment of the fulcrum 237. These bolts 242 and 243 connect the plate 241 with a block 245, which may be a built up structure and is adjustably movable up and down in a recess in the standard 26. For such adjustment a vertical screw 246 is shown extending through a fixed plate 247 and having its lower end threaded in the block 245. When the adjustment is proper the block is clamped in place by means of a bolt and nut 248 shown in Fig. 2.

The vertical adjustment of the built up block 245 not only adjusts the fulcrum of the lever 236 but adjusts all of the electrical parts 218 to 222 inclusive, some of which are carried on the lever 236 and the remainder on a plate 249 of insulating material, which is much broken away in Fig. 11, but marked at several points. The insulating plate 249 is attached by screws to the block 245 and it carries the block 222 in which the bolt 221 is mounted. By these means the loosening of the bolt 248 and the adjustment of the screw 246 permit accurate vertical adjustment of all of the timing devices operated by the notched disk 233. This times accurately the flow of current and welding action with respect to the winding of the grid.

The mechanism for severing or cutting off the individual grids will next be described referring particularly to Figs. 4 and 13, also to Figs. 12, 8, 10 and 11. The devices are intended to sever the post wire, or both of them when there are two, and the helix wire, between the successive grids. Figs. 4 and 13 show what may for convenience be termed the upper shearing cutter or blade 255 removably attached to its shank 256 and the lower blade 257 attached to its shank 258, the two blades mutually arranged to deliver a shearing action substantially at the axis of rotation, and timed so that the post or posts will be contacted simultaneously by the two blades in their shearing movement. The two stocks 256 and 258 are slidable beneath the overhanging edges of guide plates 259 spaced symmetrically with the hollow shaft 62 and secured to the left face of the turret member or rotary disk 60.

The cutting blades are normally held apart or open through outstanding pins 260 on the respective stocks, these contacted by spring arms 261 pressed apart by a spring device 262.

The forcible closing of the blades is shown effected by an opposite pair of closing levers 264 fulcrumed on studs 265 on the rotary turret. These closing levers are connected respectively by links 266 to opposite points on a trip lever 267 fulcrumed at 268 on the turret and having a stop pin 269 against which the lever normally contacts, as best shown in Fig. 13.

Preferably the cutting is caused to occur always at a time when the blades are working vertically, as shown in Fig. 13, and for this purpose a simple, effective and accurate operating means comprises a tripping bolt 271 which may be moved into or out of the path of the trip lever 267, so that when moved into the path of the lever the rotation of the turret will cause the lever to oscillate on its pivot and thus force the blades together. Preferably also the cutting plane is at such a point that the severing action between each two grids is effected at a time when a succeeding grid is being wound, so that the longitudinal feed is of a slow or normal kind rather than the skip feed, which might be interfered with by the cutting operation.

The tripping bolt 271 is mounted upon a swinging block 272 having a cap 273 confining the bolt and an adjusting screw 274 regulating the degree of projection of the bolt. The swinging block 272 is fulcrumed at 275 on the standard 32. It is shown in its upright or operative position in Figs. 8 and 12, with the bolt 271 in the path of the tripping lever 267, while in Figs. 4 and 13 the block is shown as swung leftward into its inoperative position. When each grid is to be severed the bolt is moved to position, and the trip lever, striking it is forced relatively upwardly, performing the cutting, and then riding off the bolt and snapping back to normal position to restore the cutters. The extent of projection of the bolt times the release of the lever. If desired the bolt could be swung from operative position to release the lever, timed to do so with the severance of the grid.

For swinging the block 272 to shift the tripping bolt from and into operative position the following connections are illustrated. At the left side of the block, and pivoted to outstanding lugs 276 is a connecting rod 277 having a screw threaded device for length adjustment. The rod 277 extends downward and toward the left end of the machine, and its left end is pivoted to the lower or free end of a cam lever 278. A spring 279 extends from the pivot to a post 280, tending to hold the cam lever, connecting rod and swinging block to the left. The cam lever 278 is fulcrumed at 281 on the fixed standard 31. At its left side the cam lever has a button or contact 282 adapted to be contacted by a rise or button 283 on a cam or disk 284 keyed to the same rotating sleeve 160 that carries the cam 157 and operating the ratchet wheel 162. As shown in Fig. 12 the button 283 has made contact with button 282 in one of the step by step advances of the cam, thus for the moment holding the swinging block 272 in its rightward or operative position, and the next step or advance of the cam will cause disengagement of the buttons and restoration of the trip mechanism, the cutting having been performed during engagement of the buttons.

The general operation may be reviewed briefly as follows: To start the machine the clutch lever 101 is lifted to the position shown in Fig. 2 and there latched. This closes the primary circuit contacts 211, 212, and shifts the drive clutch from braking to driving position, thus starting the rotation of the head and tail turrets and connected parts and the operation of all mechanisms. The post and helix wires A and B will have been threaded into starting position. The method of operation is such that the manufacture of grids is continuous, the feeding, winding, welding and cutting operations proceeding indefinitely, or until the supplies of wire are exhausted. The supply of post wire A on the spool 56 is mounted in the frame 53 so as to partake of the general rotation. The center of gravity of the spool of wire is in the axis of rotation so that the supply of wire is balanced and remains so throughout the depletion of the supply. From the spool the wire A is fed into the hollow shaft 50 and thence through the straightening and guiding channels therein to the feed rolls 109, 110. By these rolls the post wire A, or both if two are used, are fed forwardly without diversion of path, into and along the grooves of the arbor, projecting somewhat at the section 41 of the arbor, upon which the winding and welding are performed, and thence passing out from the grooves on to the surface of the extended arbor section 40. This feed action is steady, the speed being determined by the described gearing commencing with the fixed central gear 128. The pitch of the grid helix is thus determined, while its diameter is determined by the diameter of the winding section 41 of the arbor. The helix wire being fed from the front is drawn over the top of the winding section of the arbor and thence travels around to the welding point at the rear and thence down and to the right of the depressible guard 188, insuring that each convolution, after welding, will advance toward the right on to the small diameter arbor section 40. The guard is shown as a simple block to the right of which the wire is initially positioned. It will be unnecessary where the grid is to have two posts, but when there is a single post the opposite sides of the convolutions must be kept in advancing motion. Instead of the simple guard block 188 as shown in Figs. 4, 5, 6, 7 and 18, this block may be continued further to the right and formed with a series of threads or grooves accommodating a plurality of the convolutions, and when the guard is so constructed the winding and welding may commence somewhat further to the left on the winding section 41 than illustrated in the drawings. The welding instant occurs when the welding wheel comes directly in contact with the helix wire B at the point where the latter crosses in contact with the post wire A, so that the heavy current is applied to the union of the two wires, thus fusing and uniting them. The primary current timing device prevents the secondary current passing prematurely into the helix wire, the circuit being closed only when the dog 235 drops into the notch 234, this being immediately followed by the camming out of the dog, thus breaking the circuit and preventing the formation of an arc. The winding and welding action thus described would continue indefinitely, but for the interruption caused by the intermittent skip feeds. As an instance the ratchet wheel 162 may have 44 teeth and be advanced 2 teeth with each rotation of the cam 176 so that there will be 22 convolutions in each complete rotation of the ratchet wheel and therefore in each grid. The purpose of the skip feed is to stretch out one of the convolutions to an extended length, as best indicated by the diagram Fig. 19. The actual train of connections by which this is effected is as follows. The cam 176 lifts the lever 173 whereby the dog 170 gives one feed motion to the ratchet 162. The cam 157 partakes of this advance and it operates upon the cam lever 151 at the end of a complete cycle, after 22 rotations, to thrust the lever to the right and thus shift the arc cam 140 from its neutral to active position. The action of the arc cam however is timed by the advance of the roller 136 around it. As the roller passes around a half revolution this causes the swinging of the skip clutch lever 134 which in turn oscillates the skip clutch 130, 131 by which the feed rolls are turned at relatively high speed for a sufficient extent to produce the necessary separation of successive grids along the post wire. The cutting devices, mounted on the right hand turret, revolve with the feeding devices. As the point to be cut between each two grids arrives at the cutting plane the trip lever 267 strikes the tripping bolt 271 so that the cutters 255 and 257 are closed to cut the helix and post wires at the proper point. The severed grids travel rightwardly through the flared bore of the rotating shaft 62 and are thence delivered by chute 70 to the receptacle 71.

The respective features of novelty are available for use in combinations other than those illustrated. Thus the described plan of mounting on the revoluble turret or carrier, a means of progressively advancing the post wire so as to push or thrust it forwardly to the arbor, is not confined to the use of rolls as a feeding means. Although the roll feed is preferred any other means of gripping and progressively advancing the wire could be substituted so long as it is carried on and rotates with the carrier or turret. The arbor itself while preferably rotating with the turret might in some cases be a separate member, and otherwise rotated or operated for the proper winding of the helix wire. In terming the winding member an arbor this is intended to include any member or form on which the helix can be wound, having a contour such as to produce the proper shape of convolution, whether round or otherwise. An important characteristic of the preferred arbor or winding member is that its winding section is formed with a shallow longitudinal feed groove from which the post wire partially protrudes, thus confining the wire to its proper path while holding it properly for the welding operation. In regard to the use of rotary rolls for feeding the post wire, these in their preferred form, may be described as arranged transversely or having their axes transverse to the direction of longitudinal feed or the axis of rotation of the turret or carrier. The rolls are geared or connected so as to rotate in a definite relation to the rotation of the carrier so as to produce a predetermined pitch of wind. The same set of rolls is preferably employed for the normal or slow feed and for the fast or extra feed producing the skip operation. The ratchet wheel and attached cams which make one turn for many revolutions of the turrets may be considered as a controller of the cyclic type. By such cyclic controller or ratchet operated mechanism the skip feed is brought about at predetermined intervals after the winding of the desired number of convolutions; and the tripping of the cutting mechanism is brought about in the same manner to cause a severance between each two groups of convolutions so as to deliver the final product or individual grids.

For the purpose of certain features of the invention the mode of uniting the intersecting post and helix wires may be varied. While welding is preferred, soldering is available; or a known method of mechanical uniting may be used, comprising upsetting or crimping the metal of one or both wires to cause them to interlock, for example by grooving the post wires, inserting the helix convolutions therein, and squeezing or shaping the post wire metal to close the grooves and confine the convolutions.

There have thus been described a grid making machine and method embodying the principles and attaining the objects of the present invention. Since many matters of operation, combination, construction and arrangement may be variously modified without departing from the principles of the invention, it is not intended to limit the latter to such matters except to the extent set forth in the appended claims.

What is claimed is:

1. In a grid making machine a rotating winding arbor, a revoluble carrier or turret carrying the arbor, means carried on the carrier for advancing the post wire to the arbor, means for feeding helix wire to the rotating arbor and the advancing post wire, and means for uniting the wires at intersections.

2. In a machine for continuous grid manufacture a revoluble carrier, a rotating arbor thereon, the carrier having passages for the travel of post wire to the arbor, feed means on the carrier for advancing the post wire to the arbor, means for supplying helix wire to the arbor, and means for uniting the convolutions of the helix wire to the post wire.

3. In a grid making machine a revoluble carrier, a winding arbor, post wire feed means on the carrier for pushing the wire toward the arbor, and means for feeding and uniting helix wire thereto.

4. In a machine as in claim 3 feed means comprising feed rolls between which the post wire is advanced, and means for rotating the feed rolls in definite relation to the revolution of the carrier.

5. In a machine as in claim 3 feed means comprising feed rolls between which the post wire is advanced, and means for rotating the feed rolls in definite relation to the revolution of the carrier, said rolls arranged to bite the lateral sides of the post wire leaving the outer side clear for welding.

6. In a machine for winding and uniting grids of the type having one or more posts carrying a helix, a carrier or turret revoluble about the winding axis, a winding arbor on the same axis, feed rolls on the carrier arranged to thrust the post wire to the arbor, and gearing for revolving the carrier and rotating the feed rolls in such relation as to produce a given pitch of helix.

7. In a machine as in claim 6 a gearing having interchangeable elements to alter the helix pitch.

8. In a machine as in claim 6 means for adjusting the spacing of the feed rolls to the thickness of wire fed.

9. In a grid making machine a revoluble turret, a winding arbor, push-feeding means on the turret for advancing post wire to the arbor, a fixed central gear, and planetary gearing carried on the turret operated from said central gear for actuating the feeding means.

10. In a machine as in claim 9 actuating gearing having interchangeable elements for altering the relative speed of feed and hence the pitch of the grid.

11. In a machine for continuous manufacture of grids, means of supply of post and helix wires, a revoluble carrier having passages for the supplied post wire, transversely rotating feed means on the carrier for advancing the post wire, a winding arbor also carried by the carrier receiving the post wire from said feed means, connections for rotating the feed means to advance the post wire in definite relation to the rotation of the arbor, means guiding the helix wire to the winding point on the arbor, means for uniting the successive convolutions of helix wire to the post wire and means therebeyond for severing successive grids.

12. In a grid making machine a rotary shaft, a winding arbor turning therewith, a frame at the other end of the shaft rotating therewith, and a post wire supply spool mounted for rotation in said frame with its center of gravity substantially at the axis of said shaft.

13. In a grid making machine a hollow rotary shaft, a rotary arbor in alinement therewith, a rotary post wire supply at the other end of the shaft, a removable core within said shaft and having a longitudinal groove, a guide bar in said groove, and a wire guiding channel in said bar arranged to convey the wire and deliver it straightly to the surface of the arbor.

14. In a grid making machine a revoluble carrier, a winding arbor in alinement therewith, push feeding means on the carrier for advancing post wire to the arbor, connections for actuating the feed means at normal speed during the winding of each grid, and connections for actuating the feed means at extra speed between grids.

15. In a grid making machine a winding arbor, means feeding post wire longitudinally thereon during the winding of each grid, and means causing periodic skip feed of the post wire to leave extended posts between grids.

16. In a grid making machine a revoluble carrier and winding arbor, push feeding means on the carrier for advancing post wire to the arbor, drive connections operating during the rotation of the carrier for actuating the feeding means at normal speed, and skip feed connections for intermittently actuating the feeding means at high speed after the winding of each grid.

17. In a machine as in claim 16 drive connections operating through a one-way clutch for the normal advance of the post wire, whereby the skip feed connections may cause the feeding means to overrun.

18. In a grid making machine a revoluble carrier, a roll feed thereon for advancing post wire to the winding point, an overrunning rotary clutch for the normal actuation of the roll feed, and an oscillating clutch for effecting a skip feed thereof.

19. In a machine as in claim 18 a cam roll carried by the carrier and connected to oscillate the skip feed clutch, a normally inactive arc-cam cooperating with said cam roll, and means for periodically shifting said arc cam to cause the roll to actuate the skip feed clutch.

20. In a grid making machine a revoluble carrier, means thereon to feed post wire to the winding point, normal drive connections for said feed means, and skip feed connections therefor, comprising a cyclic controller or cam, means for turning it during the formation of grids and means thereon acting after the formation of each grid for causing the skip feed.

21. In a grid making machine a winding arbor having means for rotating it and means for longitudinally feeding post wire thereover, said arbor having a winding section with longitudinal groove to partly receive the post wire leaving it partly protruding, means feeding helix wire to the winding section, and means welding the wires at intersections.

22. In a machine as in claim 21 a guard adapted to contact the arbor at the winding section and force the convolutions of helix wire to advance with the post wire.

23. In a machine as in claim 21 a yielding guard adapted to contact the arbor at the winding section and force the convolutions of helix wire to advance with the post wire.

24. In a grid making machine a revoluble carrier, a winding arbor thereon, having a shank with a full depth longitudinal groove for the advance of post wire, followed by a winding section of smaller diameter and with a part depth continuation of such groove, followed by an extension section of still smaller diameter, means for advancing the post wire along said grooves and extension section, and means for supplying helix wire to be wound and welded to said post wire.

25. In a grid making machine, a winding arbor, means for feeding post and helix wires thereto, means for rotating the arbor, a welding member or wheel arranged to contact the helix wire adjacent to its intersection with the post wire, a primary electric circuit including timing contacts, a secondary circuit including the welding member, and timing means for said contacts including a disk turning with the arbor and having a notch or shoulder, and a follower arranged to enter the notch on each rotation to bring said contacts together at the welding instant, and to separate them promptly.

26. In a machine as in claim 25 means for relatively adjusting said disk and follower for exact timing of said contacts.

27. In a grid making machine having a rotating turret carrying the post wire feeding and helix wire winding devices and a second turret rotating therewith and carrying severing devices, a trip member or lever carried by the second turret for actuating the severing devices, a tripping member or bolt adapted to be shifted into and out of the path of the trip member, a cyclic controller or cam making one turn for a predetermined number of turns of the turrets, and a mechanical connection, from the controller for shifting the trip member into and out of tripping position at predetermined intervals.

28. In a grid making machine having a rotating turret carrying the post wire feeding and helix wire winding devices and a second turret rotating therewith and carrying severing devices, means for actuating the severing devices at predetermined intervals, and means for adjusting the cutting plane thereof.

29. In a machine as in claim 28 adjusting means comprising a shaft carrying the second turret, a bearing for said shaft, and means for longitudinally shifting the shaft on the bearing.

30. In a grid making machine having a rotating turret carrying the post wire feeding and helix wire winding devices and a second turret rotating therewith and carrying severing devices, a horizontal shaft carrying the second turret, said shaft formed with a bore receiving the severed grids and flared from the severing point to delivery point.

31. In a grid making machine mechanism for feeding and winding post and helix wires, a driving clutch therefor, a clutch shifter or lever, welding means including an electric circuit having a pair of circuit breaking contacts, and means whereby the clutch shifter separates said contacts when shifting the clutch to cease drive.

In testimony whereof, this specification has been duly signed by:

VICTOR ANDERSON.
DONALD G. TRUTNER.